United States Patent [19]

Smith

[11] Patent Number: 4,969,821
[45] Date of Patent: Nov. 13, 1990

[54] COMBINATION NOVELTY AND EDUCATIONAL DEVICE

[76] Inventor: Maureen Smith, 120 Belden St., Watertown, Conn. 06795

[21] Appl. No.: 371,732

[22] Filed: Jun. 27, 1989

[51] Int. Cl.⁵ .............................................. G09B 19/00
[52] U.S. Cl. ........................................ 434/433; 446/72
[58] Field of Search ...................... 434/430, 82, 83, 84; 446/72, 73, 74, 75, 77; 206/45.19, 45.14, 457, 232, 223; D9/436, 438, 457; D3/75; 40/411, 412, 416, 418, 419; 272/28 R, 31 R

[56] References Cited

U.S. PATENT DOCUMENTS

| D. 182,975 | 6/1958 | Robinson | D3/75 X |
| 1,596,921 | 8/1926 | Childs | 446/82 X |
| 2,131,239 | 9/1938 | Tiskey | 206/45.19 |
| 2,464,951 | 3/1949 | Stengren | 206/45.19 |
| 3,724,650 | 4/1973 | Forbes, Jr. | 206/45.19 |
| 3,768,639 | 10/1973 | Dogliotti | 206/45.19 |
| 3,867,971 | 2/1975 | Hazan | 446/74 X |
| 4,448,303 | 5/1984 | Beckenfeld | 206/45.19 X |
| 4,461,790 | 7/1984 | Snider | 206/457 X |

FOREIGN PATENT DOCUMENTS 719976  10/1965  Canada ................................ 206/232

Primary Examiner—Richard J. Apley
Assistant Examiner—Rachel Healey
Attorney, Agent, or Firm—Lawrence Hager

[57] ABSTRACT

The combination novelty and sanitation device and method is designed to promote health awareness in such a manner as, for example, to be fun or entertaining, to learn how to substantially prevent AIDS and venereal disease, or the prevention of unwanted pregnancy. The device comprises a box like container with a group of of figurines affixed atop the cover, a set of instructions and a plurality of condoms.

1 Claim, 2 Drawing Sheets

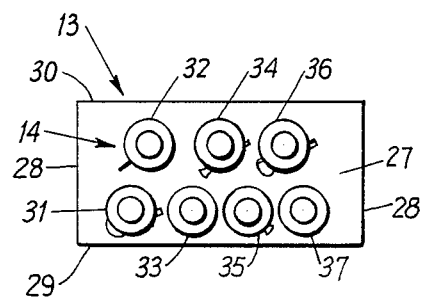
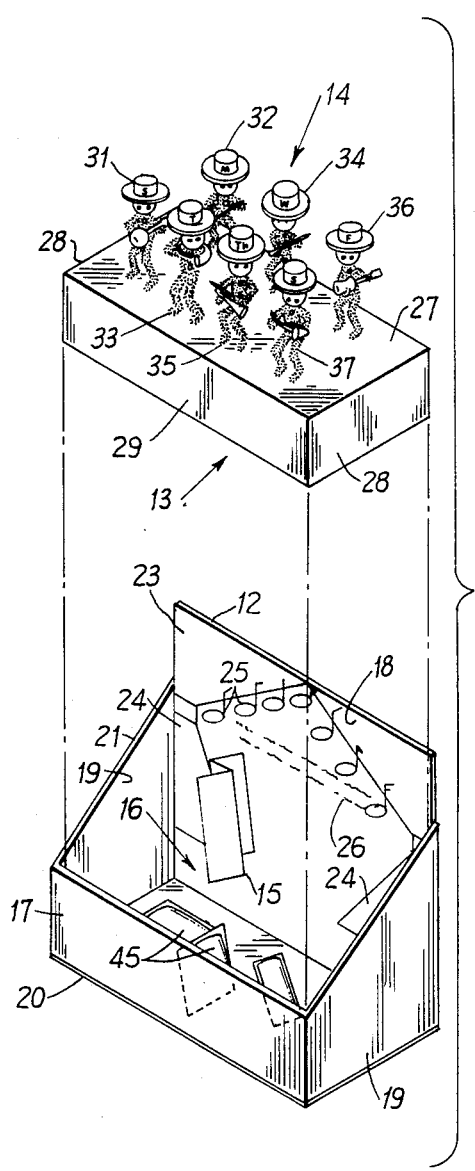
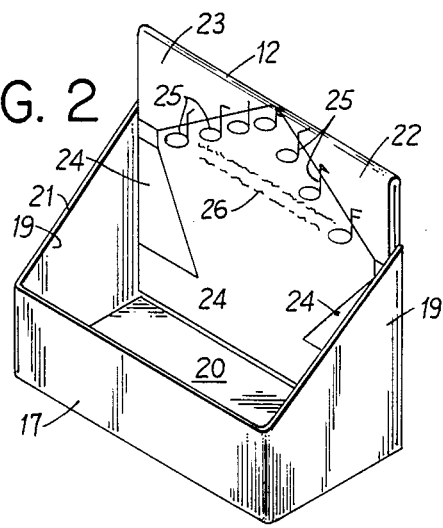

COMBINATION NOVELTY AND EDUCATIONAL DEVICE

BACKGROUND OF THE INVENTION

The invention relates generally to an improved package/display device and/or method of education. It is particularly directed to the provision of a jewelry like box or container adapted for storage of various articles such as condoms, contraceptives, K-Y brand lubricating jelly and a fact/instruction pamphlet(s).

It is well recognized that in the past few years with the onset of Acquired Immune Deficiency Syndrome (AIDS), the promotion of the use of condoms to reduce infection, and (so-called) safe sex, has become a focus of national attention.

For many years now, sex education has been an important topic within the education, political and news media arenas. Yet, a great number of unwanted pregnancies continues within all socio-economic segments of our society. In particular, teenage pregnancy and venereal disease (VD) has become an ever increasing problem.

Of prominence of late has been the moral and legal debate over the abortion issues, the so-called right-to-life vs. freedom-of-choice, which have caused extreme controversy and sometimes violence within our society.

Notwithstanding the urgency for a solution to the above problems, our society seems trapped in a morass between moralism-norms and pressures to change behavior/thinking resulting from a so called changing world.

Although the present invention does not claim to be a cure-all to the above problems, it is directed towards providing a device or mechanism or tool to overcome hesitancy and fear of being deemed crass with introducing/suggesting and educating someone to the use of items such as condoms, etc. In this manner, it is hoped that many of the problems noted above may be substantially reduced, while promoting knowledge and awareness of these controversies.

In simple terms, the present invention facilitates the achievement of the noted goals and objectives by presenting, for example, condoms and educational material about topics such as AIDS, VD, and available contraceptives, etc. in a gift or novelty package designed to be entertaining or amusing to give and receive.

PRIOR ART STATEMENT

The following patents represent some of the prior art pertinent to the field of packaging: U.S. Pat. Nos. 3,755,925 issued Sep. 4, 1972 to Arthur E. Court; 3,278,015 issued Oct. 11, 1966 to Louis R. Bernstein and 1,657,391 issued Jan. 24, 1928 to J. C. Haney. These prior art patents are merely typical of the art showing packaging devices and are not in any way intended to be an all inclusive list of the pertinent patents.

In contrast to the prior art, the present invention provides an amusing/entertaining package/container device designed to enable the presentation of sensitive issues such as condom use at a, for example, pre-wedding party in a socially acceptable manner, while facilitating educational information about sexual habits, conduct and dangers. The package/container device provides for example, figurines or other objects displayed to heighten curiosity as to purpose and/or function of the package(d) gift. Appropriate amusing phrases and displays may also be adorned on the package/ container device to enhance the feelings of curiosity and amusement from a visual perspective. In this manner, a sensitive topic may be introduced at a party in an amusing way while facilitating education.

SUMMARY OF THE INVENTION

Generally speaking, in accordance with the invention, a combination (so-called) novelty/gag gift package/container and health promoting objects are provided which utilizes one or more figurines and visual display items and phrases affixed to a container for carrying condoms, lubricating jelly and booklets about sex education.

According to the preferred embodiment of the invention, a jewelry like box is provided with seven figurines or statuettes resembling a musical instrument band. Each member of the band contains a letter indicative of a day of the week, for example, S for Sunday, M for Monday and so on. the exterior package contains a statement associated with the figurines which reads, for example, How do you play with your instrument? Let us show you how we play ours. This statement is prominently displayed with a plurality of musical note symbols. Although other phrases may be used, it is intended that the phrase be both in good taste while thought provocative and amusing. In this manner, presentation at a pre-wedding party, etc. would be both acceptable conduct and an entertaining conversation gift.

OBJECTS OF THE INVENTION

Accordingly, it is an object of the present invention to provide a combination novelty/gag gift and educational device adapted to overcome apprehension of dealing with sensitive, moral, sanitational, health or sexual issues in an informal and amusing manner.

Another object of the invention is to provide a new packaging for various items such as condoms and lubricating jelly and educational booklets related to sex education.

Another object of the invention is to provide a means and method of providing sex education.

Another object of the invention is to provide a new and improved packaging method.

Another object of the invention is to facilitate responsible sexual conduct and practices.

It is a further object of the invention to provide a new and improved educational and/or entertainment device which incorporates and integrates the presentation of information and basic complimenting material, for example, condoms, to an adult about to become sexually active.

it is a further object of the invention to provide a new and improved educational and/or novelty gift packaging device and method of educating individuals on the importance of taking preventative measures to avoid AIDS, VD, or unwanted pregnancies.

Further advantages and objectives of the present invention will be apparent from the following detailed description of the preferred embodiment of the invention. Like reference numerals refer to like devices/functions throughout.

BRIEF DESCRIPTION OF THE DRAWINGS

FIG. 2 is an exploded view of the novelty gift and educational device according to the present invention;

FIG. 3 is a top plan view of the upper stage platform and cover member of novelty gift and educational device according to the present invention; and FIG. 4 is a perspective plan view of the lower box like member of the novelty gift and educational device according to the present invention.

DESCRIPTION OF THE PREFERRED EMBODIMENT

Figure 1:
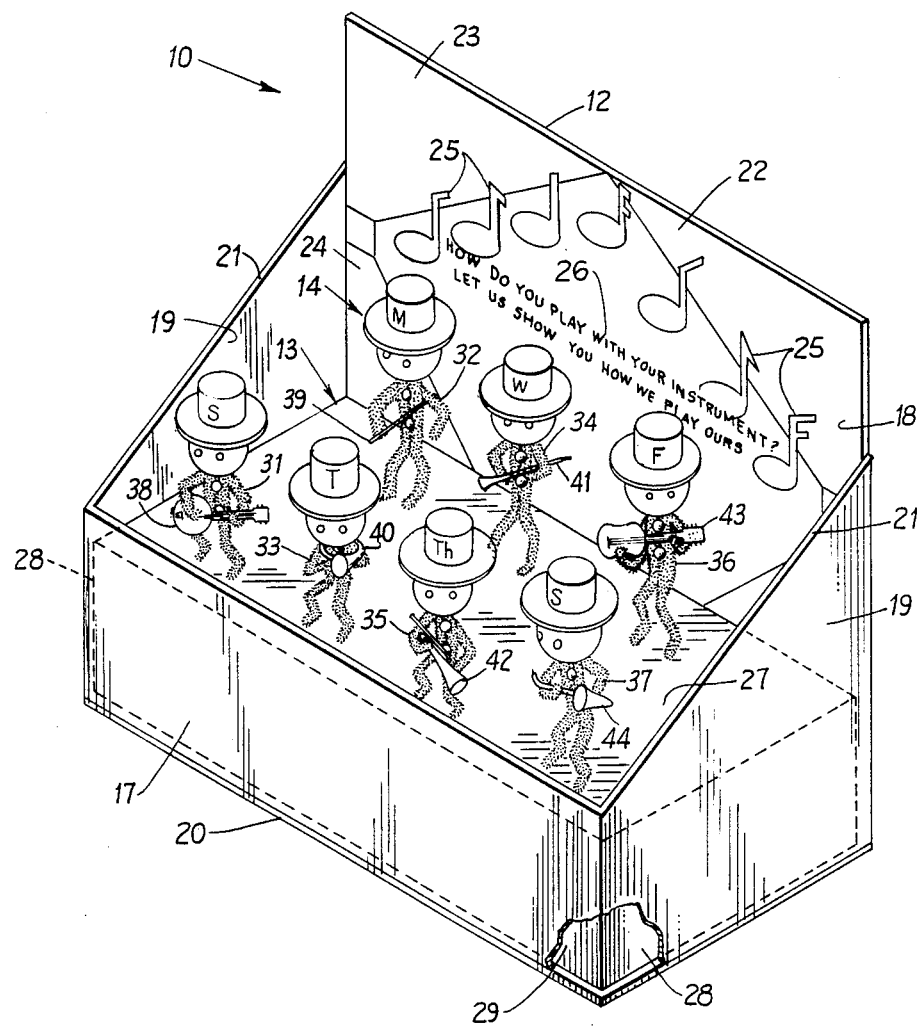
FIG. 1 is a perspective plan view of the combined novelty gift and educational device according to the present invention.

With reference to the figures, and particularly to FIG. 1, a preferred embodiment of the invention is shown. The preferred embodiment generally comprises an inexpensive gift package 10 which includes a box shaped base member, a backboard member 12, a stage or platform member 13, a plurality of figurines 14, an educational and/or gag-joke booklet 15, and one or more paraphernalia 16.

The box member, comprises a front wall 17, a rear wall 18, a pair of side walls 19 and a bottom wall 20. The box member may be formed of any suitable material such as cardboard, plastic or wood. Side walls 19 may include sloped upper portions 21, which serve to frame the stage area.

The backboard member 12 basically is rectangular shaped and projects upwardly from the rear of the box member. Backboard member 12 may be formed integrally with base member or may be separately formed and affixed to base member during assembly. Preferably, the backboard member 12 is decorated so as to present a sense of expectation such as the pre-amble to the punch line of a joke. In the preferred embodiment 10, the backboard member 12 has colored sections 22, 23, and 24, to simulate a curtained stage, a plurality of musical notes 25, and an indirect or multi-meaning statement 26 such as—how do you play with your instrument? let us show you how we play ours—. This statement 26 is predominantly displayed on backboard member 12 in proximity to and for mental association with the instruments being played by the band members 14. Backboard member 12 may be formed of any suitable material such as cardboard, plastic or wood.

Stage member 13 comprises a floor section 27, a pair of downwardly projecting side walls 28 and a downwardly projecting front and rear wall members, 29 and 30 respectively. Stage member 13 is dimensioned for being slidably inserted into and removed from the box member. Stage member 13 may be formed of any suitable material such as, for example, cardboard, plastic or wood. Figurines 14 are arranged and affixed atop stage member 13 as seven members of a musical band. Each band member 31 through 37 is depicted as playing a musical instrument 38 through 44, respectively. Each band member 31 through 37 contains a letter or symbol or abbreviation of a respective day of the week. For example, M for Monday, T for Tuesday and so on. The figurines may be of conventional design.

Booklet 15 is preferably a sex education booklet which provides basic information such as the proper use of condoms, lubricating jelly such as K-Y brand, and other facts such as symptoms of different forms of venereal disease. A joke book (not shown) may also be included to enable the gift package 10 to be entertaining when the gift is opened at, for example, a bachelor party or so called shower party. In this manner, a sensitive topic may be broached in an entertaining way while still providing useful information and items that can be utilized.

Also included in the gift package 10 are a plurality of sealed condom packages 45 and K- brand lubricating jelly.

While the invention has been described with respect to a preferred embodiment, it should be apparent to those skilled in the art that numerous modifications may be made thereto without departing from the spirit and scope of the invention. For example, the stage and backboard members could be integrally made and pivot mounted to the box member.

I claim:

1. A combination amusement and sex education and health safeguarding gift package device, having particular application for presentation at selected parties, in combination comprising:

a box shaped member having a front wall (17), a rear wall (18), a pair of side walls (19), a bottom wall (20);

a backboard member (12) basically having a rectangular shape and affixed to said box member for projecting upwardly from a rear portion of said box member, said backboard member having decorative indicia printed thereon comprising a plurality of musical notes (25) and a multi-meaning statement comprising the phrase - How do you play with your instrument? Let us show you how we play ours!;

a stage member (13) having a floor section (27), a pair of downwardly projecting side walls (28), downwardly projecting front and rear wall members (29, 30), said stage member being dimensioned for being slidably inserted into and removed from the box member;

seven figurines (14) decorated for being representative of a musical band, each said figurine band member having a musical instrument and an indicia on a hat member being representative of a predetermined day of the week whereby each band member figurine has associative meaning to proper use of each respective instrument each day of the week;

booklet means (15) removably inserted into said box member containing information related to sex education, proper use of condoms, lubricating jelly, and other facts and symptoms of different forms of sexually transmitted diseases and how to substantially prevent such diseases with proper use of condoms;

a plurality of sealed condom packages (45) removably inserted into said box member.

* * * * *